Sept. 25, 1934. G. E. CLEVELAND 1,974,417
MACHINE FOR CUTTING GROOVES AND SLOTS
Filed July 17, 1931 6 Sheets-Sheet 1

INVENTOR
GROVER E. CLEVELAND
BY
ATTORNEY

Sept. 25, 1934.  G. E. CLEVELAND  1,974,417
MACHINE FOR CUTTING GROOVES AND SLOTS
Filed July 17, 1931   6 Sheets-Sheet 3

INVENTOR
GROVER E. CLEVELAND
BY
ATTORNEY

Sept. 25, 1934.  G. E. CLEVELAND  1,974,417
MACHINE FOR CUTTING GROOVES AND SLOTS
Filed July 17, 1931  6 Sheets-Sheet 4
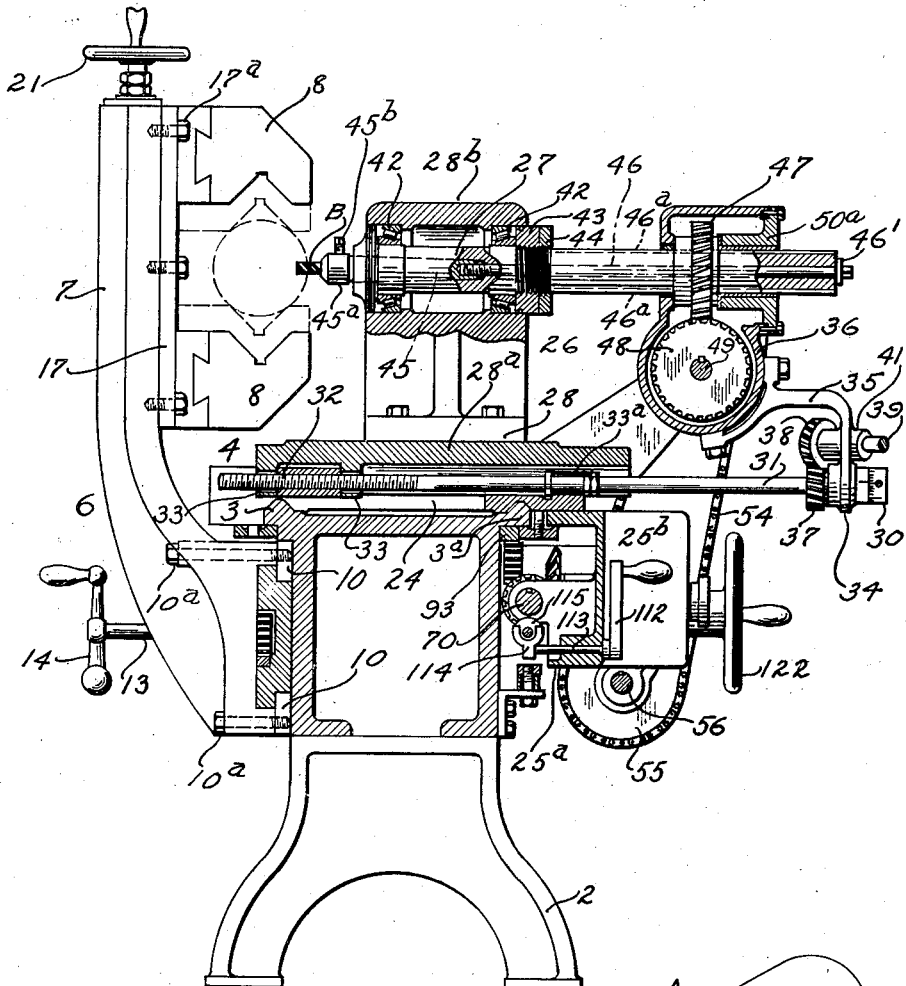
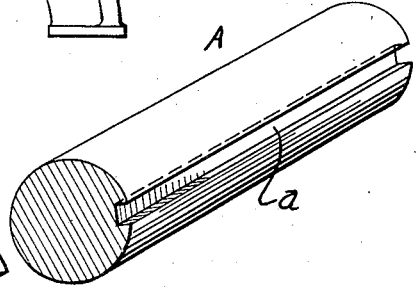
Fig-4.
Fig-12
INVENTOR
GROVER E. CLEVELAND
BY
ATTORNEY Sept. 25, 1934.   G. E. CLEVELAND   1,974,417
MACHINE FOR CUTTING GROOVES AND SLOTS
Filed July 17, 1931   6 Sheets-Sheet 5
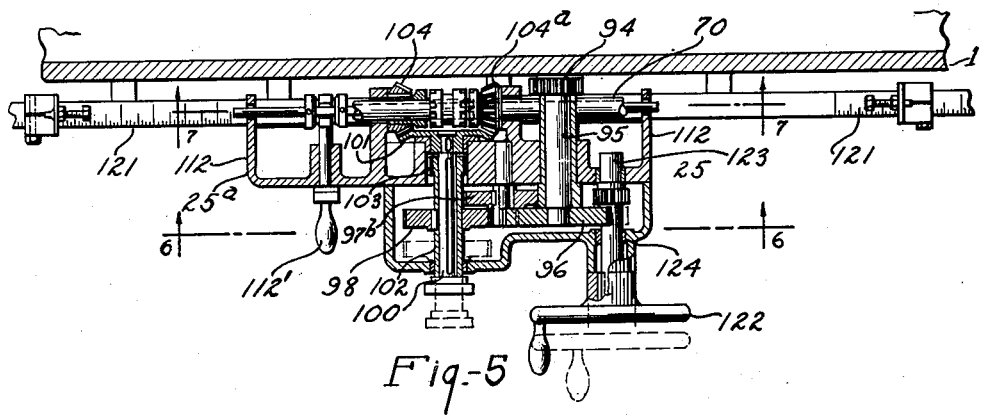
Fig.-5
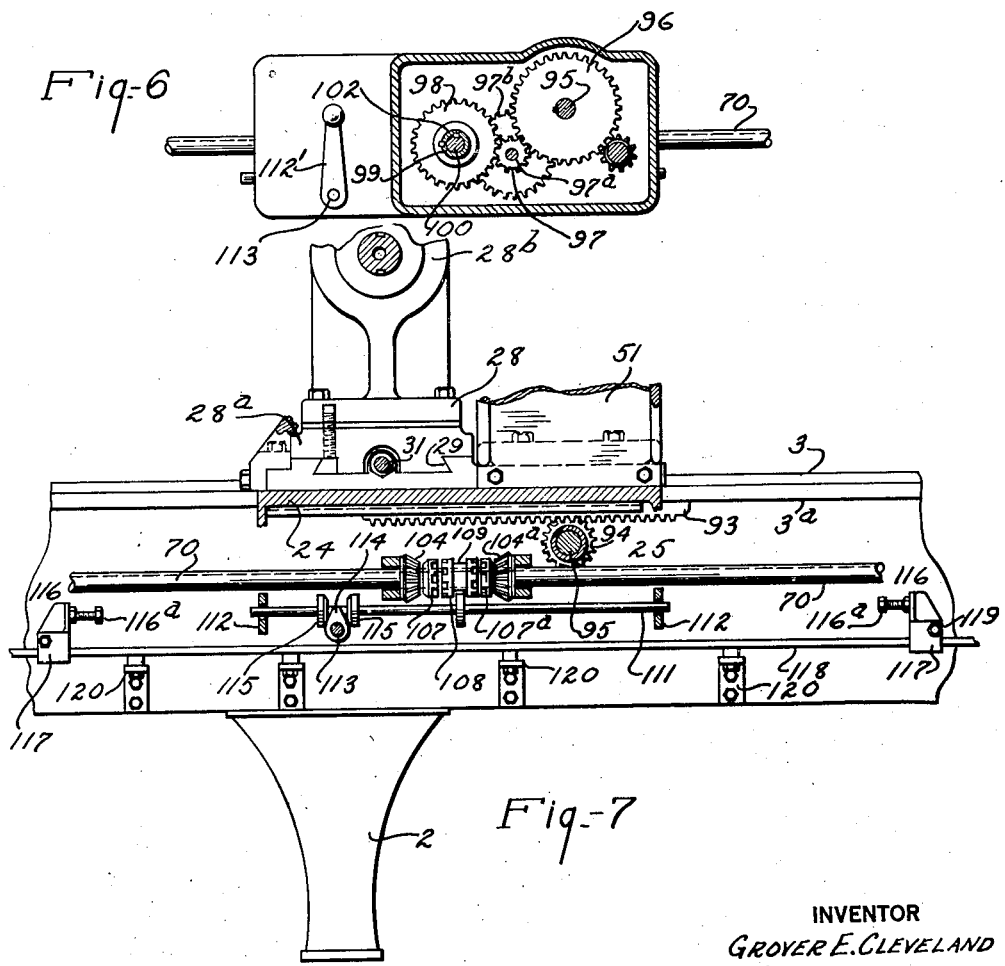
Fig.-6
Fig.-7
INVENTOR
GROVER E. CLEVELAND
BY
ATTORNEY Sept. 25, 1934.   G. E. CLEVELAND   1,974,417
MACHINE FOR CUTTING GROOVES AND SLOTS
Filed July 17, 1931   6 Sheets-Sheet 6
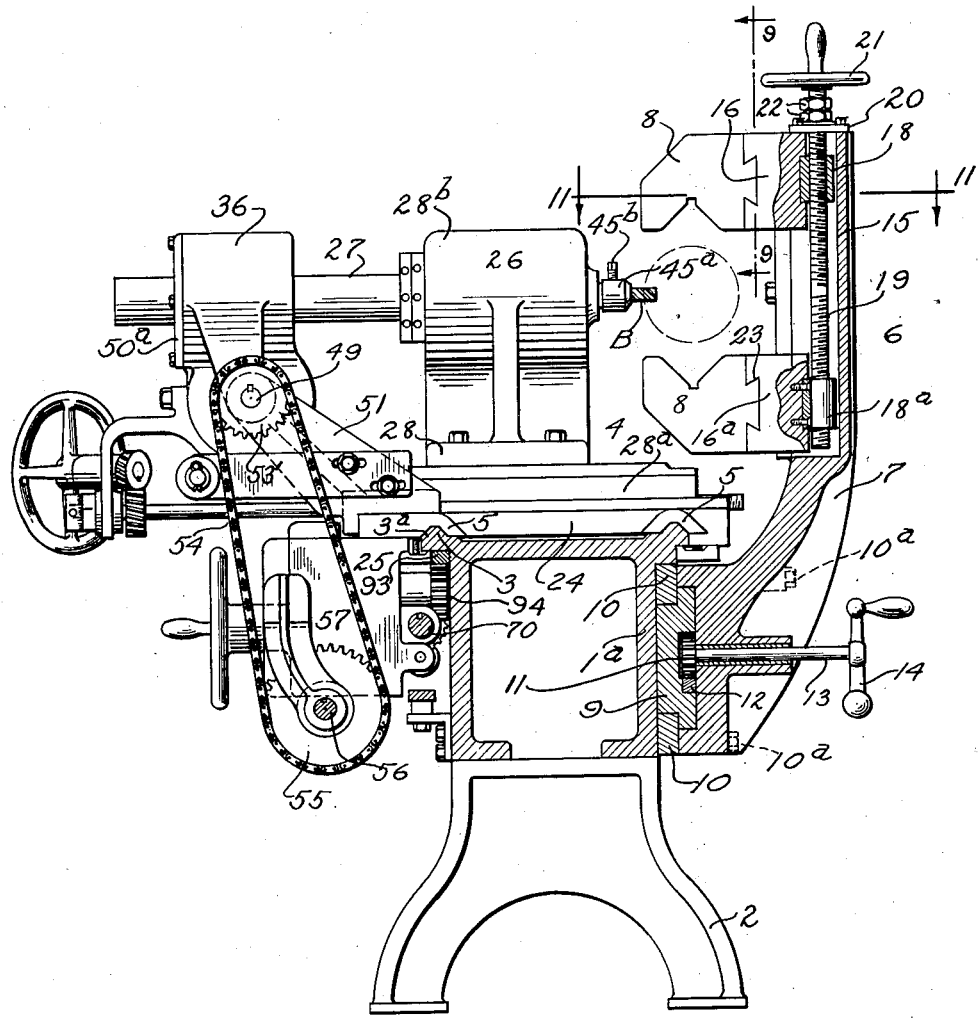
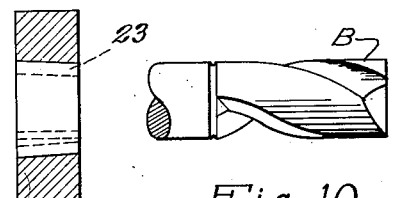
Fig.-8
Fig.-9   Fig.10   Fig.11
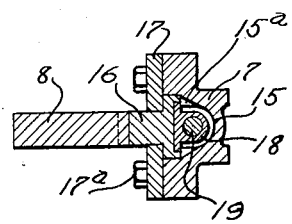
INVENTOR
GROVER E. CLEVELAND
BY
ATTORNEY Patented Sept. 25, 1934

1,974,417

UNITED STATES PATENT OFFICE 1,974,417

MACHINE FOR CUTTING GROOVES AND SLOTS

Grover E. Cleveland, Cleveland, Ohio, assignor to The Yoder Company, Cleveland, Ohio, a corporation of Ohio Application July 17, 1931, Serial No. 551,425

7 Claims. (Cl. 90—15)

This invention relates to a machine for cutting grooves, elongated openings and the like, such for example, key-ways in shafts, elongated grooves or recesses in walls, elongated slots or openings in walls and splines in shafts.

In the preferred application of the invention I have adapted it to the forming of a key-way in a shaft, but in the following disclosed exemplification of the invention, it is to be understood that such disclosure constitutes words of description and not limitations.

One object of the invention is to provide an improved machine of this character capable of cutting a key-way, groove or opening of any desired predetermined length.

Another object of the invention is to provide a machine for cutting key-ways or the like of any predetermined depth and/or width.

Another object of the invention is to provide a machine in which a key-way may be cut in a shaft from end to end thereof irrespective of its length.

A further object of the invention is to provide a machine in which the work is readily positioned and cutting of the key-way, groove or slot is effected in a ready and rapid manner.

A further object of the invention is to provide an improved machine capable of cutting a key-way, slot or the like by the relative movement of the tool and work in one direction.

Other objects of the invention will be apparent to those skilled in the art to which my invention relates from the following description taken in connection with the accompanying drawings, wherein Fig. 1 is a side view, parts being broken away, embodying my invention.

Fig. 2 is a plan view.

Figs. 2a, 3, 4 and 5 are sections on the lines 2a—2a, 3—3, 4—4, and 5—5, respectively, of Fig. 1.

Figs. 6 and 7 are sections on the lines 6—6 and 7—7 respectively, of Fig. 5.

Fig. 8 is a section on the line 8—8 of Fig. 1.

Fig. 9 is a section on the line 9—9 of Fig. 8.

Fig. 10 is a detail view of the cutter, enlarged.

Fig. 11 is a section on the line 11—11 of Fig. 8.

Fig. 12 is a perspective view of a shaft having a key-way cut in it from end to end.

Fig. 13 is a fragmentary view showing a modified form of construction.

Figure 1:
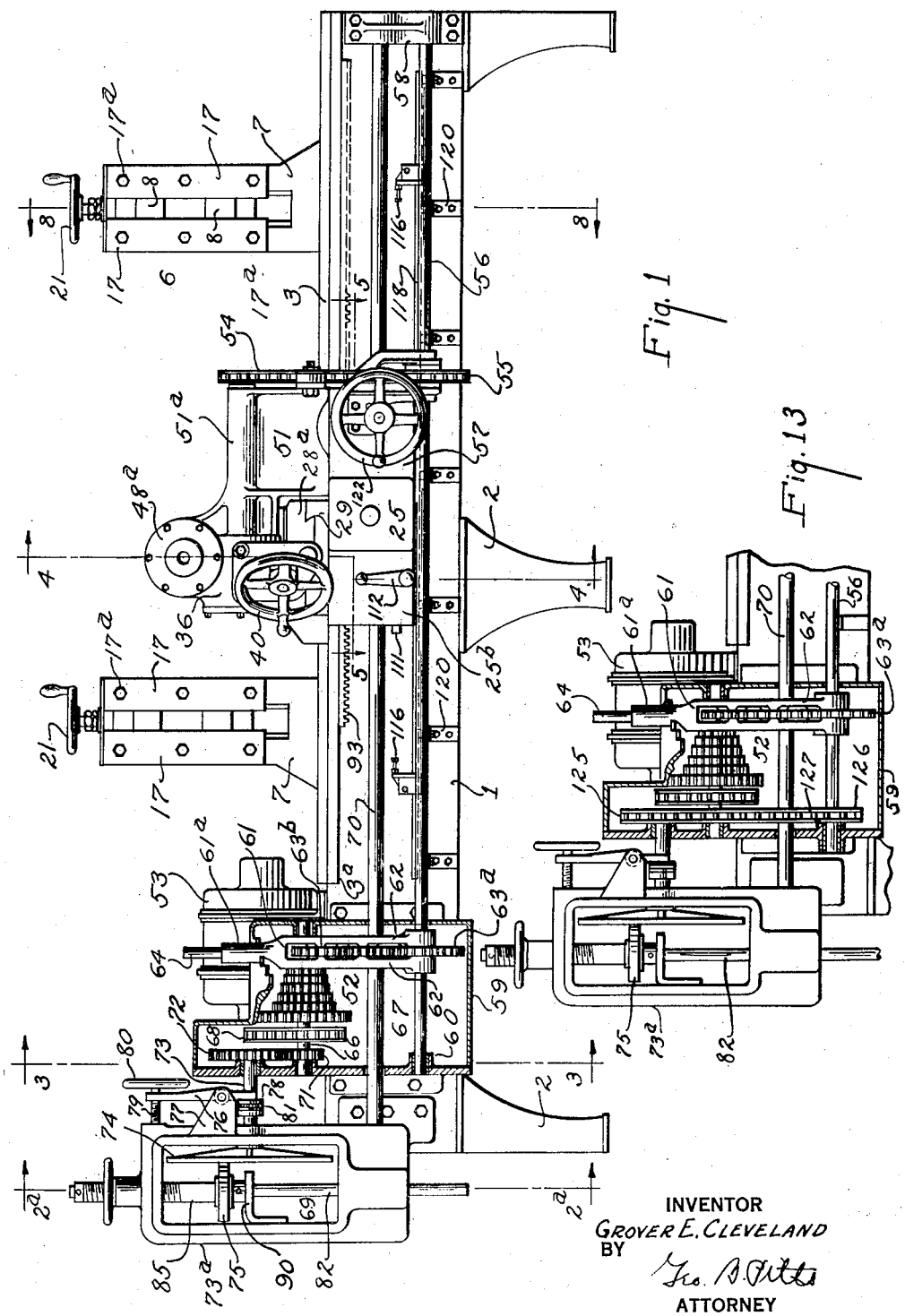
Figure 2:
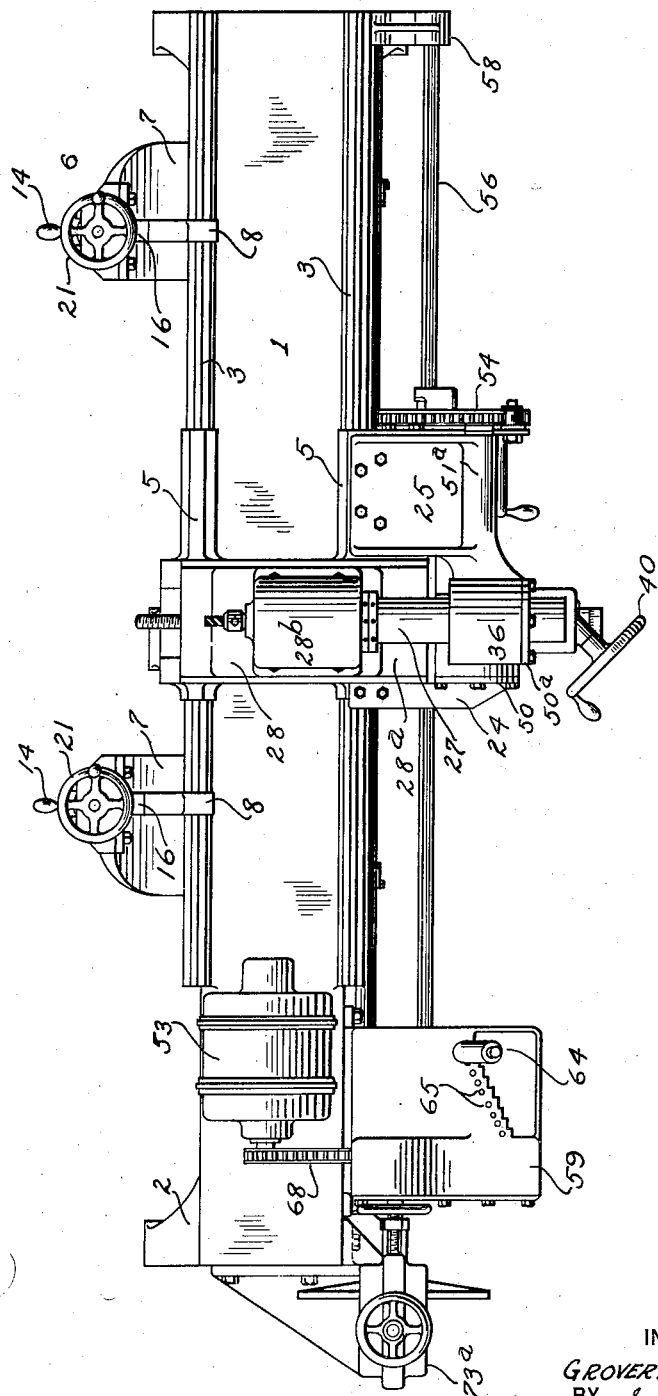
Figure 3:
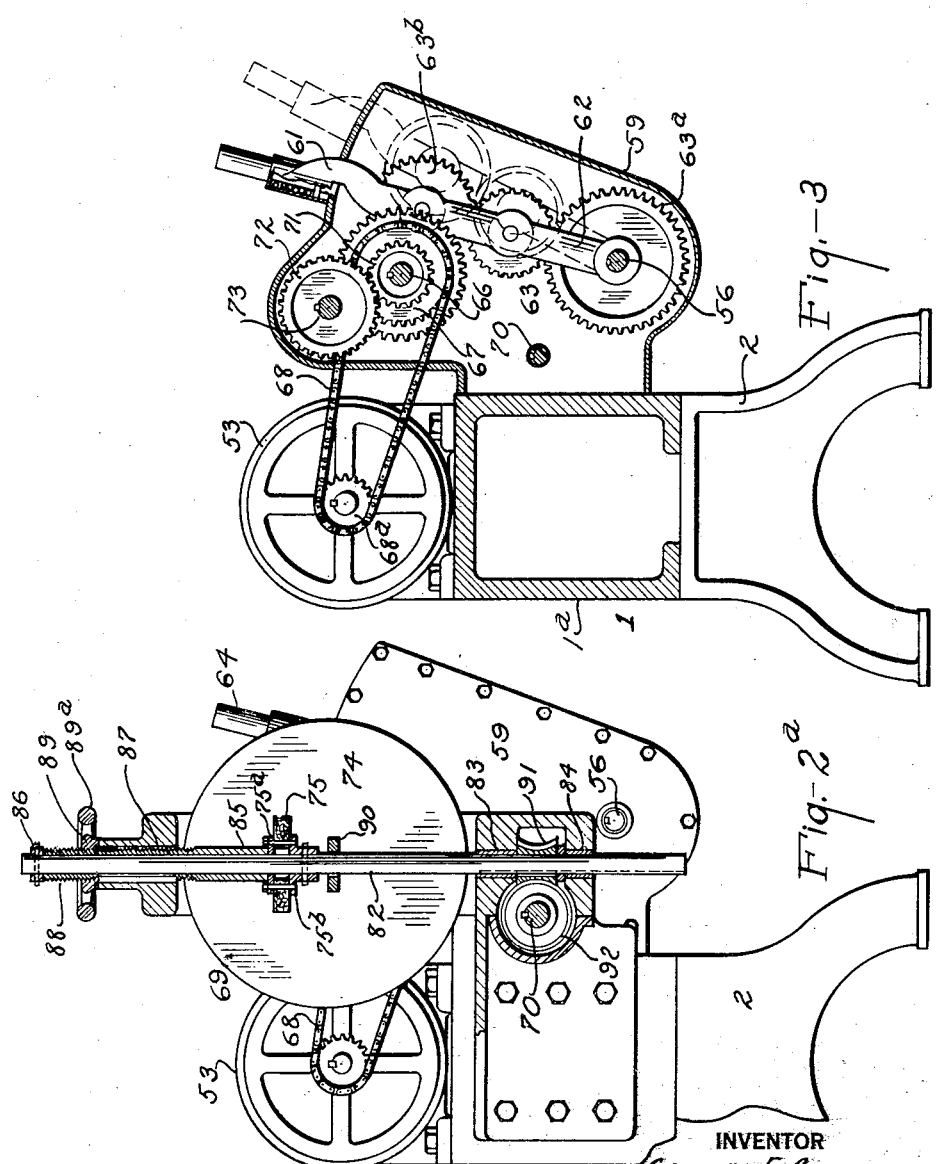

In the drawings, 1 indicates a bed, mounted on legs 2, and provided through a portion of its length with guides 3 on which a support indicated as an entirety at 4, slides from end to end thereof or throughout a predetermined distance as later set forth, the support being provided with suitable shoes 5 to engage the guides 3.

6 indicates as an entirety the support for the work adjustably mounted on the rear side wall 1a of the bed 1. Where the work comprises an elongated member, such as a shaft A, the support 6 comprises two spaced up-standing members 7, each adjustably mounted on the rear side wall of the bed 1 and each carrying a pair of clamping jaws 8, 8. The construction and mounting of each member 7 and construction and mounting and operation of the clamping jaws are similar so that the following description of one member and the jaws thereon will suffice for the other member and the jaws carried by it.

9 indicates a guide plate suitably secured to the rear side wall 1a, a single guide plate being provided for both upright members 7. The plate 9 is provided along its upper and lower edges with flanges spaced from the wall 1a. The lower end of each upright member 7 is shaped to receive the guide plate and its flanges and has secured to its end walls strips or bars 10 which extend inwardly behind the flanges and thus slidably secure the member 7 to the guide plate; the strips or bars 10 being secured to the member 7 by bolts 10a. Adjustment of each member 7 along the guide plate is effected by a pinion 11 and a rack 12, the pinion being fixed to a shaft 13 suitably mounted in the wall of the member and extending therethrough and carrying a handle 14 at its outer end, and the rack being mounted on the guide plate 9. As shown in Figs. 4 and 8, the guide plate is recessed from end to end to accommodate the pinion and rack. The upper portion of the upright member 7 is formed with a longitudinally extending recess 15 adapted to slidably receive upper and lower blocks 16, 16a, which removably carry the jaws 8, 8. As shown in Fig. 11 the blocks 16, 16a, have lateral portions engaging the sides of the recess 15, the rear walls 15a of the recess and over-hanging front plates 17, secured to the front walls of the member 7 by bolts 17a. The rear sides of the blocks 16, 16a, have secured to them nuts 18, 18a, respectively, into and through which is threaded a screw 19. The upper and lower portions of the screw 19 are reversely threaded and the nuts 18, 18a, for such portions are correspondingly threaded, so that when the screw is rotated the blocks are simultaneously moved toward or away from each other, whereby the work A is clamped between the jaws or released therefrom for removal. The mounting of the jaws on the members 7 is such that they are supported equal distances from the axis of the work or a horizontal plane corresponding to the plane of the axis of a tool or the plane in which the latter axis moves when the tool is fed longitudinally of the frame or bed 1; although it will be apparent that where the work is other than a shaft it may be desired to clamp the work to or upon the support 6 in some different relation to the tool, in which event the mounting for the jaws 8, 8, will be rearranged or adjusted accordingly.

In the above construction, it will be noted that the work may be supported in operative relation to the tool B even though the diameter thereof at the portion engaged by one pair of jaws is greater or less than that portion engaged by the other pair of jaws.

The central portion of the member 7, between the walls 15a, is cut away to accommodate the nuts 18, 18a, and screw 19. The screw 19 is rotatably supported in or upon the member 7, preferably having bearing in a plate 20 which is bolted to the upper end of the member. The screw 19 extends through the plate 20 and carries a crank wheel 21. The screw is locked against turning by jam nuts 22. Each jaw is detachably secured to a block, preferably by a tongue and groove connection 23, the walls of which taper, as shown in Fig. 9.

The support 4 comprises a base 24, which slides longitudinally of the bed 1, being operated in either direction by a power means, indicated as an entirety at 25, and a stock 26, in which the shaft 27 for the tool B is rotatably mounted. The stock 26 consists of a base portion 28 rigidly secured to a slide 28a and a hollow portion 28b formed integrally with the base portion 28. The slide 28a is slidably mounted in ways or guides 29 carried by the base 24 and extending at right angles to the guides 3, whereby the stock may be moved transversely of the bed and the tool positioned to cut a groove or key-way of any predetermined depth, as determined by a gage 30 (Fig. 4). Transverse adjustment of the stock 26 is effected by a shaft 31 having a threaded portion threaded into and through a nut 32, the nut being held against endwise movement relative to the slide 28a by bosses 33 depending therefrom in front and rear of the nut 32 (see Fig. 4). The shaft 31 is rotatably supported in a bearing 33a provided on the base 24 and a bearing 34 carried on the end of an arm 35, which is secured to a housing 36. The purpose of the housing will later be set forth. The means for turning the shaft 31 may consist of a skew gear 37 fixed to the shaft and engaging the bearing 34 (whereby the latter takes the outward end thrust of the shaft) and a gear 38 meshing with the gear 37, the gear 38 being fixed to a shaft 39 having a crank wheel whereby it may be rotated. The shaft 39 is mounted in a bearing 41, the walls of which are formed integral with the arm 35.

The shaft 27 extends through the hollow portion 28b of the stock 26, being rotatably supported therein by spaced sets of taper roller bearings 42. The inner race for the inner bearing seats against an annular shoulder provided on the shaft 27 near its inner end, whereas the inner race for the outer bearing is engaged by a collar 43 adjustable on the shaft, the collar 43 being preferably threaded on the shaft (see Fig. 4) and locked in adjusted position by a nut 44. The shaft 27 is preferably hollow from end to end, the inner wall at the inner end of the shaft being of conical shape to receive a device 45 having at its inner end a socket 45a into which removably fits the tool shank which is secured in the socket by a set screw 45b. The device 45 has threaded into its outer end a rod 46 which extends through the shaft and carries at its outer end a collar 46' and a squared free end to take a tool. Rotation of the rod 46 will effect pull on the device 45 endwise outwardly and thus serve to secure the device to the inner walls of the shaft 27. The device 45 may be removed upon disconnection therefrom of the rod 46. The tool B has a diameter corresponding to the width of the key-way to be cut. By substituting tools of different diameters key-ways of different widths may be cut. The shaft 27 is provided along its outer portion with key-ways 46a, preferably on diametrically opposite sides, to provide for the slidable connection therewith of a gear 47, by means of which the shaft 27 is driven. The gear preferably comprises a worm gear, in mesh with a worm 48. The worm 48 is keyed to a shaft 49. The housing 36 encloses the worm gear 47 and worm 48. It is provided with removable endwalls 50, 50a, the latter being provided with an inwardly extending hollow boss, which serves as a bearing for the outer end of the shaft 27, and engages the hub of the gear to hold it against outward movement and against the inner end wall of the casing 36 (see Fig. 4). The walls of the housing 36 are preferably integrally connected to a standard 51 mounted on the base 24, the upper end of the standard being shaped to form an elongated tubular member 51a forming a bearing for the shaft 49. The shaft 49 may be driven in any desired manner, but preferably through a changeable speed mechanism 52 by a motor 53, which also supplies power to move the support 4 along the bed 1, as later set forth. The shaft 49 is provided with a sprocket 53' for a suitable sprocket chain 54 which runs therearound and around a sprocket 55. The sprocket 55 is drivingly connected to a shaft 56, for example, by a key and key-way, whereby the sprocket may slide with the support 24 along the guides 3, while transmitting the power of the shaft to the chain 54. The sprocket 55 is supported on the shaft 56 between a pair of brackets depending from the side wall of a casing 57 to which reference will later be made. The shaft 56 is supported at the right hand end of the frame 1 (as viewed in Fig. 1) by a hanger 58. The opposite end of the shaft 56 extends into a gear box 59 and has bearing at 60 in its outer side wall (see Fig. 1). 61 indicates an arm having spaced side members 62, 62, between which is mounted a gear train 63. The lower ends of the members 62 terminate in knuckles which swingably support the arm on the shaft 56. The lower end-gear 63a of the gear train 63 is splined to the shaft 56, whereby the arm 61 may be adjusted longitudinally thereof. The upper end-gear 63b is adapted to engage any one of the stepped gears 52, whereby the power thereof, at the desired speed, is transmitted to the shaft 56. The arm 61 is provided with a handle 61a having a spring operated plunger 64 adapted to fit into one of the openings 65, whereby the gear 63b is held in mesh with the desired stepped gear 52. The stepped gears 52 are fixed to a shaft 66, having bearing at its ends in the side walls of the box 59. The shaft 66 is provided with a sprocket 67, over which runs a chain 68. The chain 68 runs over a sprocket 68a fixed to the shaft of the motor 53.

69 indicates a driving mechanism for a shaft 70 through which power is transmitted to move or reciprocate the support 24 on the ways 3 longitudinally of the frame 1. The driving mechanism 69 is preferably driven from the shaft 66. Of this mechanism, 71 indicates a spur gear which meshes with a gear 72. The gear 71 is fixed to the shaft 66. The gear 72 is fixed to the inner end of a shaft 73. The outer end of the shaft 73 carries a friction disk 74 adapted to engage a friction wheel or pinion 75. The shaft 73 is supported at one end in the outer side wall of the box 59 and at its inner end by the side wall of a frame 73a, the gear 72 and disk 74 being spaced on the shaft 73 so as to permit slight movement of these parts endwise of the shaft to effect frictional engagement of the disk 74 with the pinion 75 to drive the latter or disengagement therefrom when adjustment of the pinion is to be made. The disk 74 is adjusted toward and held in frictional engagement with the pinion 75 by a lever 76, pivoted on a bracket 77, which is supported by the frame 73a. The lower end of the lever 76 engages a collar 78 surrounding the shaft 73. The upper end of the lever 76 is formed with a threaded opening to receive a screw 79, which bears against the wall of the frame 73a and when rotated by the hand wheel 80, serves to swing the lever and thus force the disk 74 toward the pinion 75. The collar 78 comprises an inner part which may be fixed to the shaft 73 and an outer part loose thereon, and engaged by the bifurcated end of the lever 76. The opposed faces of the collar parts form races for a thrust bearing 81. The pinion 75 is fixed to a shaft 82, which is disposed in a vertical plane intersecting the axis of the shaft 73 and which is adjustable endwise so as to adjust the pinion 75 radially of the disk 74. The pinion 75 comprises a disk of suitable material clamped between plates 75a, 75b, the lower plate having a depending collar which is pinned to the shaft. The lower end of the shaft 82 rotates and slides in spaced bearings 83, 84, provided in the lower end wall of the frame 73a. The upper portion of the shaft 82 is provided with a sleeve 85 which is interposed between the plate 75a and a collar 86 pinned to the upper end of the shaft. The sleeve 85 is slidable through an opening 87 formed in the upper end wall of the frame 73a, and serves as a bearing for the upper end of the shaft 82. The upper portion of the sleeve 85 is provided with screw threads 88, with which engages a nut 89, having a hand wheel 89a. The sleeve 85 throughout its threaded portion is provided with a key-way and the opening 87 is provided with a key-way, a key being mounted in the key-ways to prevent the sleeve from rotating, so that when the nut 89 is rotated, the sleeve will be moved endwise in the opening 87. To relieve the shaft 82 of bending strain, I provide therefor an intermediate bearing 90 supported by a bracket, which is fixed to the outer side wall of the frame 73a.

91 indicates a worm splined to the shaft 82. The worm 91 is mounted between the bearings 83, 84, so as to hold it against movement with the shaft 82 when the latter is raised or lowered, as above described. The worm 91 meshes with a worm gear 92 which is fixed to the shaft 70.

The shaft 70 is mounted at its left hand end (as viewed in Fig. 1) in a bearing provided in the frame 73a. At its right hand end, the shaft 70 is mounted in a bearing provided in the hanger 58. The shaft 70 is drivingly connected to the support 24 to move it on the ways 3 by the following mechanism: 93 indicates a rack fixed to the frame 1, preferably to the under side of one of the laterally extending walls 3a formed integrally with the frame 1. The rack 93 extends along the bed 1 for a distance slightly greater than the travel of the support 24 on the guides 3. 94 indicates a pinion arranged to mesh with the rack 93. The pinion 94 is fixed to the inner end of a shaft 95. The pinion shaft 95 and the driving means therefor are mounted in housings 25a, 25b, which are connected to the support 4 and move therewith. The outer end of the shaft 95 is provided with a gear 96, which meshes with a pinion 97. The pinion 97 is fixed to a shaft 97a, which also has fixed to it a gear 97b to be later referred to. The pinion 97 in turn meshes with a gear 98, which in turn is fixed to a shaft 99. The shaft 99 preferably comprises an inner member 100 fixed to the hub of a bevel gear 101 and an outer or sleeve member 102 splined to the inner member 100 and slidable thereon. The inner end of the sleeve member 102 is provided with a pinion 103 adapted to mesh with the gear 97b, and the outer end of the sleeve member 102 has fixed to it the gear 98. When the sleeve member 102 is in the position shown in full lines in Fig. 5, the gear 98 is in mesh with the pinion 97, so that the pinion 94 will be driven at one speed; when the sleeve member 102 is in the position shown in dotted lines, the pinion 103 is in mesh with the gear 97b, so that the pinion 94 will be driven at a different speed. As will be understood from Fig. 5, the shafts for the driving elements above referred to are suitably mounted in the walls of the housings 25a, 25b.

The bevel gear 101 is adapted to be driven by the shaft 70 through bevel pinions 104, 104a, with which it meshes at all times. The pinions 104, 104a, are secured to sleeves 105 which loosely rotate on the shaft 70. The sleeves are held against outward movement (that is, movement away from each other) by the walls of the bearings 106 for the shaft 70, these walls being formed integrally with the walls of a housing 25a. The inner ends of the sleeves 105 terminate in clutch elements 107, 107a, arranged to be alternately engaged by a double clutch member 108, splined to the shaft 70 between the clutch elements and slidable endwise thereon. It will be understood from the foregoing description, that when the clutch member engages one clutch element 107, the shaft 70 drives the shaft 99 in one direction and when such member engages the other clutch element, the shaft 70 drives the shaft 99 in the opposite direction, whereby the support 4 is moved along its guides in either direction. The clutch member 108 is formed with an annular groove 109, into which fits a collar 110. The collar 110 is fixed to a movable member, such as an endwise movable rod 111 slidably mounted in openings formed in the end walls 112 of the housing 25a. The rod 111 is preferably supported in a horizontal position and parallel to the frame 1 so that it may be readily operated automatically as later set forth. The rod 111 is operated in either direction either automatically to stop the movement of the carriage upon reaching a predetermined position in either direction of movement, or manually. The manually operating means comprise a crank 112' fixed to a rock shaft 113, which is suitably mounted in the walls of the housing 25a. The inner end of the rock shaft carries an arm 114 disposed between two collars 115, 115, fixed to the rod 111, and arranged to act through the latter to move the rod endwise. In Figs. 5 and 7, the clutch member 108 is shown in mid-position. By rocking the shaft 113, the rod 111 may be moved in either direction to effect engagement of the clutch member 108 with one of the clutch elements 107, 107a.

The automatically operating means comprise abutments 116 mounted on the frame 1 in the path of movement of the rod 111 as it moves endwise with the support 4. Each abutment may consist of a bolt 116a threaded into a standard 117, which is slidably mounted on a guide 118. The standard is adjustable along the guide, being clamped thereto in the desired position by a nut and bolt 119. The guide 118 is bolted to a plurality of brackets 120. The standards 117 are spaced on the guide 118 to limit the movement of the support 4 automatically when moving in either direction. The standards 117 may be adjusted according to gages 121, and finer adjustment may be made by rotating the bolts 116a.

As will be noted from Figs. 5 and 7, the abutments 116 are arranged in the path of movement of the rod 111, so that as the support 4 moves in either direction, the rod will engage with the adjacent abutment, and be arrested thereby. Such movement of the rod, effects disengagement of the clutch member from one clutch element 107 or 107a. Accordingly it will be seen, once the machine is started manually by operation of the crank 112', the slide will be automatically stopped. The length of travel of the support 4 is determined by the adjustment of the abutments 116 dependent upon the length of the key-way or slot to be cut. When the support 4 is at rest, it may be adjusted longitudinally of the frame 1 by the following: 122 indicates a hand wheel fixed to a shaft 123. The shaft 123 is rotatably and slidably mounted in bearings 124 provided in the walls of the housings 25a, 25b (see Fig. 5). The shaft 123 is provided with a pinion 125 which is out of mesh with the gear 96 in one position of the shaft 123 (see full lines in Fig. 5), but upon movement of the shaft endwise outwardly, as shown in dotted lines in Fig. 5, the pinion 125 engages with the gear 96, and may then be operated to drive the gear in either direction.

In the operation of the machine, the shaft A, other piece of work or wall is positioned in the support 6, between the pairs of jaws 8, 8, thereof; next, the shafts 56, 57, are set in operation at the desired speeds; next, the support 4 is adjusted along its guides 3 manually to position the tool opposite one end of the key-way to be cut. Where the key-way is to be cut from end to end of the work A, as shown in Fig. 12, the support 4 is adjusted or moved to position the tool B beyond one end of the work. Next, the slide 28 is adjusted transversely of the frame 1, which operation engages the tool B with the work A and cuts a hole therein to the desired depth, that is, the depth of the slot or key-way to be cut or milled in the work; next, the handle 112' is operated to effect engagement of the clutch member 108 with one of the clutch elements 107, 107a, dependent upon the direction the support is to be moved. As the support 4 moves along its guides 3, the key-way $a$ is cut in the work as shown in Fig. 12.

In my construction, the key-way is cut while the support 4 is moving in one direction. These operations are effected by providing a tool having cutting edges $b$ on its end, whereby it may cut a hole into the recess to the desired depth when fed transversely by the adjustment of the slide, and cutting edges $b'$ extending inwardly from its free end, whereby the key-way is cut as the support 4 travels longitudinally of the frame 1, the diameter of the tool being equal to the width of the key-way. From the foregoing description it will be noted that the speed of either shaft 56, 70, may be changed independently of the other shaft.

The speeds of the shafts 56, 70, are varied according to the width of the key-way and the character of the material operated upon. Where the key-way is relatively wide, the travel of the support 4 is relatively slow and the speed of rotation of the tool may be reduced; where the key-way is relatively narrow, the speed travel of the support and rotation of the tool is increased.

In Fig. 13, I have shown a form of construction in which the shaft 66 is driven from the shaft 56, for which purpose I provide a sprocket 125 on the shaft 66, a sprocket 126 on the shaft 56 and a chain 127 running around these sprockets. In this arrangement, any adjustment of the gear train 63 relative to the stepped gears will affect the speed of both shafts 56, 66. If further adjustment of the speed of the shaft 70 is desired it may be effected by the adjustment of the pinion 75, as already set forth.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In a machine of the class described, the combination of a frame having guides, a support movable along said guides, a tool stock mounted on said support for adjustment transversely of said guides and having means for supporting a tool in a predetermined horizontal position, means for rotating the tool supporting means, means for moving said support along said guides, a work support including a pair of jaws disposed equal distances from a plane coincident with the axis of the tool, and means for simultaneously moving the jaws toward and from said plane.

2. In a machine of the class described, the combination of a frame having guides, a support movable along said guides, a tool stock mounted on said support for adjustment transversely of said guides and having means for supporting a tool in a predetermined horizontal position, means for rotating the tool supporting means, means for moving said support along said guides, a work support including spaced pairs of jaws disposed equal distances from a plane coincident with the axis of the tool, and means for simultaneously moving the jaws of each pair toward and from said plane.

3. In a machine of the class described, the combination of a frame having guides, a pair of shafts mounted on said frame and extending longitudinally thereof, means for driving said shafts, a support movable along said guides, a tool stock mounted on said support for adjustment transversely of said guides, and having supporting means for a tool, said means including a shaft for rotating said tool, driving connections for said tool shaft including a power element splined to said tool shaft and a power element splined to one of said first mentioned shafts, a power mechanism having change speed gears mounted on said support and engaging said frame, and a double clutch mechanism on said support drivingly connected between said power mechanism and the other of said first mentioned shafts to move said support in either direction, said double clutch mechanism comprising a pair of gears having clutch elements loosely mounted on said shaft, a gear engaging said gears and a clutch member splined to said shaft and movable into engagement with either of said clutch elements.

4. In a machine of the class described, the combination of a frame having guides, a pair of shafts mounted on said frame and extending longitudinally thereof, means for driving said shafts, a support movable along said guides, a tool stock mounted on said support for adjustment transversely of said guides, and having supporting means for a tool, said means including a shaft for rotating said tool, driving connections for said tool shaft including a power element splined to said tool shaft and a power element splined to one of said first mentioned shafts, a power mechanism having change speed gears mounted on said support and engaging said frame, a double clutch mechanism on said support drivingly connected between said power mechanism and the other of said first mentioned shafts to move said support in either direction, said double clutch mechanism comprising a pair of gears having clutch elements loosely mounted on said shaft, a gear engaging said gears and a clutch member splined to said shaft and movable into engagement with either of said clutch elements, and power mechanism including change speed gearing.

5. In a machine for cutting key-ways and the like, the combination of a frame having guides, a tool stock having means for supporting the inner end of a cutting tool extending inwardly therefrom, means for rotating said tool supporting means, means for moving said stock along said guides, means for adjusting said stock at right angles to the direction of movement thereof along said guides, said moving means and adjusting means being operable during rotation of said shaft a pair of supports mounted on said frame for independent adjustment longitudinally thereof, a pair of jaws on each of said supports disposed above and below and equal distances from a plane coincident with the axis of the tool, and means for simultaneously adjusting each pair of jaws relative to said plane.

6. In a machine for cutting key-ways and the like, the combination of a frame having guides, a tool stock having means for supporting the inner end of a cutting tool extending inwardly therefrom, means for rotating said tool supporting means, means for moving said stock along said guides, means for adjusting said stock at right angles to the direction of movement thereof along said guides, said moving means and adjusting means being operable during rotation of said shaft, a pair of supports mounted on said frame for independent adjustment longitudinally thereof, and means on each of said supports for clamping a work piece, said clamping means on each support comprising a pair of jaws above and below the tool and disposed equal distances therefrom and means for simultaneously moving the jaws toward and from the tool.

7. In a machine for cutting key-ways and the like, the combination of a frame having guides, a tool stock having means for supporting the inner end of a cutting tool extending inwardly therefrom, means for rotating said tool supporting means, means for moving said stock along said guides, means for adjusting said stock at right angles to the direction of movement thereof along said guides, said moving means and adjusting means being operable during rotation of said shaft, a pair of supports spacedly mounted on said frame, and means on said supports for clamping a work piece, said clamping means on each support comprising a pair of jaws disposed equal distances from the plane of the tool and means for simultaneously moving the jaws into clamping engagement with the work piece.

GROVER E. CLEVELAND.